US007016073B1

(12) United States Patent
Meyer et al.

(10) Patent No.: US 7,016,073 B1
(45) Date of Patent: Mar. 21, 2006

(54) DIGITAL HALFTONE WITH AUXILIARY PIXELS

(75) Inventors: Robert J. Meyer, Penfield, NY (US); Allen T. Retzlaff, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/362,022

(22) Filed: Jul. 27, 1999

(51) Int. Cl.
H04N 1/405 (2006.01)
H04N 1/407 (2006.01)
H04N 1/29 (2006.01)

(52) U.S. Cl. .................. 358/1.9; 358/3.06; 358/3.14; 358/3.27; 358/300

(58) Field of Classification Search ............... 358/1.9, 358/3.06, 3.26–3.27, 3.09–3.19, 533–536; 382/299, 257, 258, 308, 256, 266, 267, 269
See application file for complete search history.

(56) References Cited

U.S. PATENT DOCUMENTS

| 3,784,397 A | 1/1974 | Sato et al. ............... 117/37 LE |
| 4,544,264 A | 10/1985 | Bassetti et al. ............ 355/14 R |
| 4,544,922 A | 10/1985 | Watanabe et al. ........... 340/728 |
| 4,625,222 A | 11/1986 | Bassetti et al. ............. 346/160 |
| 4,675,830 A | 6/1987 | Hawkins ..................... 364/518 |
| 4,847,641 A | 7/1989 | Tung ........................... 346/154 |
| 4,868,600 A | 9/1989 | Hays et al. .................. 355/259 |
| 5,029,108 A | 7/1991 | Lung ........................... 364/519 |
| 5,184,226 A | 2/1993 | Cianciosi ................... 258/296 |
| 5,193,008 A | 3/1993 | Frazier et al. .............. 358/298 |
| 5,299,308 A * | 3/1994 | Suzuki et al. ............... 345/501 |
| 5,337,162 A * | 8/1994 | Sakano ....................... 358/3.01 |
| 5,459,828 A | 10/1995 | Zack et al. .................. 395/151 |
| 5,479,175 A | 12/1995 | Cianciosi et al. ........... 347/252 |
| 5,504,462 A | 4/1996 | Cianciosi et al. ........... 332/109 |
| 5,532,828 A * | 7/1996 | Mitsuse ...................... 358/3.15 |
| 5,555,557 A * | 9/1996 | Mailloux .................... 382/299 |
| 5,602,572 A * | 2/1997 | Rylander ................... 358/3.09 |
| 5,673,121 A | 9/1997 | Wang .......................... 358/456 |
| 5,706,046 A | 1/1998 | Eki et al. .................... 347/252 |
| 5,740,330 A * | 4/1998 | Abe ............................. 358/1.2 |
| 5,818,504 A * | 10/1998 | Chung et al. ............... 347/251 |
| 5,835,123 A * | 11/1998 | Chung et al. ............... 347/251 |
| 6,020,979 A * | 2/2000 | Zeck et al. .................. 358/1.9 |
| 6,038,039 A | 3/2000 | Zeng .......................... 358/447 |
| 6,177,948 B1 | 1/2001 | Estabrooks et al. ......... 347/129 |
| 6,181,438 B1 * | 1/2001 | Bracco et al. .............. 358/1.9 |
| 6,192,160 B1 * | 2/2001 | Sunwoo et al. ............. 382/257 |
| 6,266,154 B1 * | 7/2001 | Allen ......................... 358/3.06 |
| 6,297,889 B1 * | 10/2001 | Loce et al. .................. 358/1.9 |

* cited by examiner

*Primary Examiner*—Scott A. Rogers
(74) *Attorney, Agent, or Firm*—Christopher D. Wait (57) ABSTRACT

Utilization of non-printing high-spatial-frequency auxiliary pixels are introduced into the bitmap of halftones utilized in an image to obtain local control of the image development by modification of local average voltage in the development nip. These auxiliary pixels embody frequencies or levels of charge that are past the threshold for printing on the Modulation Transfer Function (MTF) curve, and therefore by themselves result in no toner deposition on the resultant page. These auxiliary pixels will however, position the toner cloud by modulating it and compensate for cleaning field and toner supply effects. This will better position the toner cloud to ensure adequate toner supply to all parts of the image so that the desired printing pixels will print as intended and provide a more faithful rendering of grayscale information in the image.

12 Claims, 11 Drawing Sheets

NON-PRINTING "WHITE" AUXILIARY PIXEL

NON-PRINTING "BLACK" AUXILIARY PIXEL

DIGITAL HALFTONE WITH AUXILIARY PIXELS

RELATED CASES

Cross reference is made to the following applications filed concurrently and incorporated by reference herein: Ser. No. 09/362,021 entitled "Auxiliary Pixel Patterns For Improving Print Quality" by Robert J. Meyer and Allen T. Retzlaff, Jr., Ser. No. 09/362,020 entitled "Improved Font Print Quality with Auxiliary Pixels" by Robert J. Meyer and Allen T. Retzlaff, Jr.

BACKGROUND OF THE INVENTION AND MATERIAL DISCLOSURE STATEMENT

The present invention relates to improving images produced by utilizing digital halftones or spatial dithering in electrostatographic printers and reprographic copiers and more particularly, concerns solving the image problems of edge delineation, leading edge deletion, grayscale and highlight fidelity in an image. Such leading edge deletion and placement problems may manifest as phenomena often referred to as line shrinkage, halo and white gap artifacts. These artifacts are also sometimes referred to as "slow toner". However, when halftone dots are employed, the more apparent manifestation of the above slow toner problem includes the loss of small highlight dots and shadow detail which may not print at all, and other halftone dots that may print only in part. The result is a reduction in printer tone gamut as well as distortion of the printer Tonal Response Curve (TRC).

In a typical electrophotographic printing machine, a photoreceptor is charged and exposed to record an electrostatic latent image therein. The photoreceptor is advanced to a development station where toner is deposited on the latent image.

One type of development system forms a toner cloud in the development zone. One type of development system in which a toner powder cloud is described is U.S. Pat. No. 4,868,600, which is herein incorporated in its entirety by reference.

It has been found that when a toner powder cloud development system is used, large amounts of toner are deposited where there is uninterrupted expanse of charged area (such as toward the middle of large image shapes), and toner is starved from locations where there is a strong or sudden change in charge (as found with narrow lines or shapes and on the edges of larger shapes). The result for digital halftones is a loss of highlight and shadow detail. The effect on large halftoned shapes causes them to exhibit a defect called halo, which manifests itself most clearly at the interfaces of solid colors. Halo in color systems appears as white lines at interfaces which should otherwise be a perfect match between two colors. This defect is also observable in single color images as an edge distortion or displacement and line shrinkage dependent on the size of the printed object. Line shrinkage of course leads to poor line and text quality due to an erosion or shrinkage of the line edges and corners. Various approaches have been devised to solve these highlight and shadow detail slow toner effects and thus extend the TRC and printer tone gamut.

The following patents appear to be relevant to manipulation and enhancement of the edge of image shapes.

U.S. Pat. No. 5,029,108 to Lung discloses an edge enhancement method and apparatus for dot matrix devices wherein a group of gradient mask matrices are applied to a "current matrix", wherein a target pixel is surrounded by neighboring pixels, to determine if the target pixel is at a location where a change of brightness occurs. From this matrix operation, a conclusion is derived as to the existence or non-existence of an edge and the direction of the brightness change. The current matrix and a predetermined number of previously evaluated and yet to be evaluated pixels are then compared to a set of reference bit patterns which depict possible segment changes to be corrected. If the result indicates that the target pixel is on an edge of a changing edge segment, a corresponding code will be generated to modify the target pixel to enhance the smoothness of a segment transition. In the case of an electrophotographic printing machine, the specific code will change either the location or the size of the target pixel; whereas in the case of a monochrome screen display, the specific code will change the intensity of the target pixel.

The U.S. Pat. No. 5,479,175 to Cianciosi et al. is a an apparatus for enhancing the output along edges of discharged area developed regions in a tri-level imaging system employing a pulse width and position modulated signal ROS for exposure. The invention enables the identification and selective alteration of video data used to drive the ROS so as to extend the developed regions by a selected amount and eliminate digitization artifacts present in the image to be printed. The extension of the discharged area developed regions is accomplished by extending the width of, or adding separate, exposure pulses in adjacent areas to enable development within a portion of those regions.

In U.S. Pat. No. 5,193,008 to Frazier et al., the output of a conventional laser printer having a resolution of 300×300 dots per inch (dpi), and a predetermined threshold level for forming image dots, is enhanced by selectively providing interleaved image dots between the normal scan lines of the laser printer. Such interleaved image dots between scan lines may be achieved by appropriately energizing the two pixels directly above and directly below that desired interleaved dot, with the energizations at one or both pixels being selectively below the threshold level for producing a dot on the scan line, but with the combined energization at the desired interleaved point being above the threshold level to produce the desired interleaved dot. An input 600×600 bit map may be stored in a random access memory, and three vertically aligned bits from one main scan line and adjacent 600 dpi lines above and below are drawn from the RAM and are supplied to a logic and video output circuit which produces variable pulse width modulated pulses to the laser printer to produce the enhanced image.

U.S. Pat. No. 3,784,397 discloses a method for forming images by providing an electrostatographic imaging member bearing an electrostatic latent image on a recording surface. Then positioning the recording surface spaced from and facing a development electrode. This is followed with contacting the recording surface with toner particles whereby at least a portion of the toner particles deposit on the recording surface to form at least a partially imaged recording surface. Then maintaining the field strength of the development electrode as weak during the initial period of development and then increasing the field strength of the development electrode during the latter period of development, to form a substantially uniform developed image substantially free of streak, halo, edge effect, and background deposits.

SUMMARY OF THE INVENTION

The present invention relates to an improved halftone comprising a plurality of original pixels and a non-printing auxiliary pixel. The auxiliary pixel replaces one of the original pixels to improve the printing of the halftone cell.

Another aspect of the present invention relates to a method for improving the printing of an image; including receiving a source image comprising original pixel data, and processing the source image original pixel data with a halftone comprising embedded auxiliary pixels therein.

In accordance with still another aspect of the present invention, there is provided in a digital imaging system a method for substantially optimizing a rendition of a document image. The method comprises receiving a representation of the document image. The received document representation is processed with an image halftone including embedded therein nonprinting auxiliary pixels to improve the rendition of the document image.

DESCRIPTION OF THE INVENTION

For a general understanding of the present invention, reference is made to the drawings. In the drawings, like reference numerals have been used throughout to designate identical elements. In describing the present invention, the following term(s) have been used in the description.

An "image" is a pattern of physical light. It is understood that an image may be further comprised of shapes. An image as such, may include characters, words, and text as well as other features such as graphics. An image may be divided into "segments" or "regions", each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color form" of an image, the binary form, gray scale form, and color form each being a two-dimensional array defining an image.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified, such as by image processing operations.

An "image input terminal" (IIT) is a device that can receive an image and provide an item of data defining a version of the image. A "scanner" is an image input device that receives an image by a scanning operation, such as by scanning a hardcopy document. An "image output terminal" (IOT) is a device that can receive an item of data defining an image and provide the image as a visual output. A "xerographic marking engine" is an image output device that provides the output image in hardcopy document form.

A "lead edge deletion" is an image defect which occurs on the leading or first-printing edge of a solid area. It is an edge displacement in a direction opposite to the process motion of the deposited toner as with respect to the lead edge of the latent electrostatic image pattern on the photoreceptor.

An operation performs "image processing" when it operates on an item of data that relates to part of an image. A "morphological" or "logic-based" operation operates using logical operators (e.g., AND, OR, INV, NOT) applied to a digital image. In particular, the logic operations are typically applied in association with a "structuring element" such as an aperture having a predefined shape or other set of characteristics.

Figure 1:
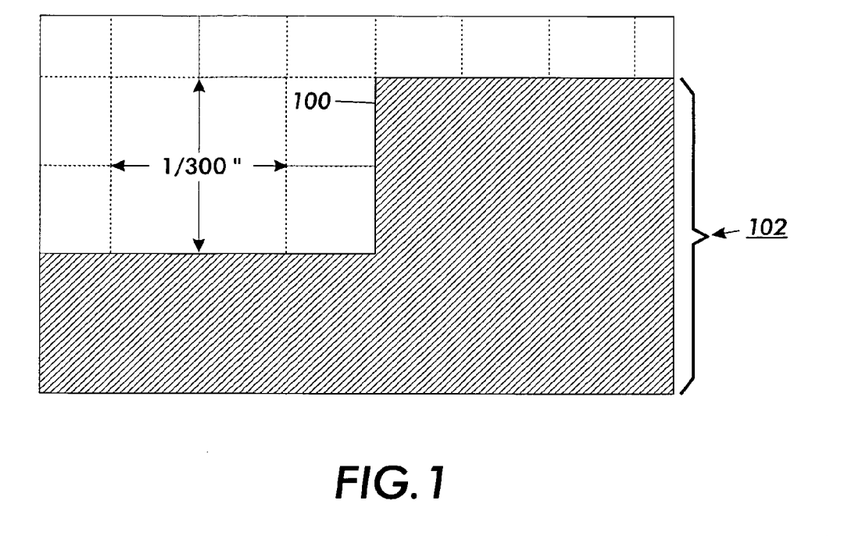
FIG. 1 is part of a line, hypothetically rendered at 300×300 dpi.

Turning to FIG. 1, depicted is a region of an image as at a diagonal edge 100 on an image shape 102. For this image in the original data a pixel is 300 by 300 dots per inch (dpi). At that resolution diagonals will exhibit distinct jagged stair-case transitions in the edge 100 of the image shape 102.

Figure 2:
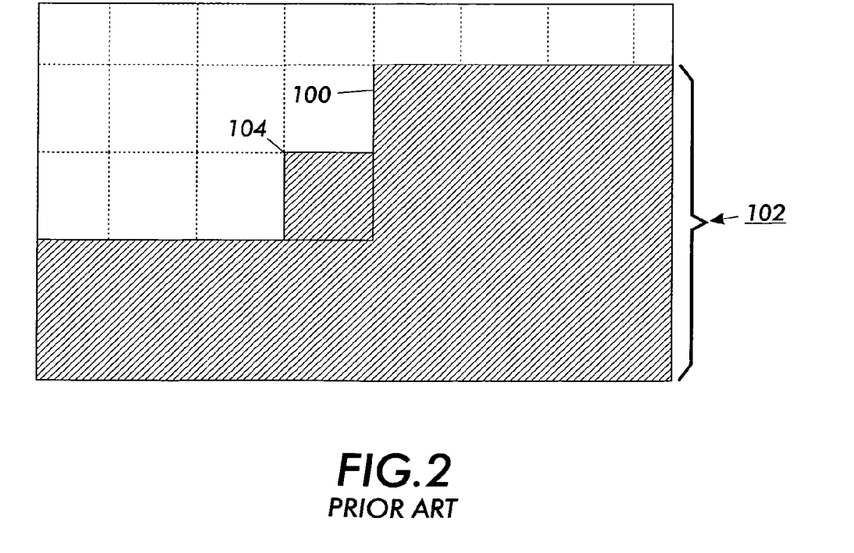
FIG. 2 the line from FIG. 1 smoothed by templates and rendered at 600×600 dpi.

FIG. 2 shows a possible result to the data in FIG. 1 after expansion to 600×600 dpi by means of pattern matching templates and application of Resolution Enhancement Technology (RET). RET is a technique used in various Hewlett Packard and Xerox printers. It smoothes out the jagged stair-case transition resulting from digitization by inserting an added pixel 104. This new added pixel is at the higher dpi resolution.

Figure 3:
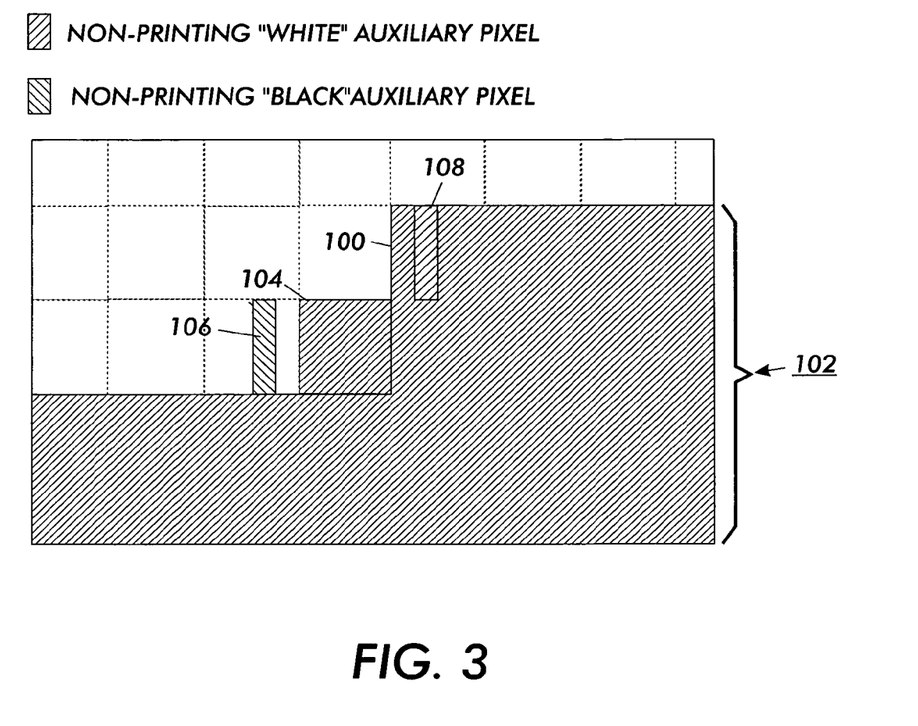
FIG. 3 the line from FIG. 2 with non-printing auxiliary dots.

In FIG. 3 there is an example of the present invention as applied to the data found in FIG. 2. The RET generated added pixel 104 is retained. However, ultra fine pixels herein referred to as "non-printing" pixels, or "auxiliary" pixels as substituted into the bitmap, have been placed close to the edge of, but both interior and exterior to the image shape. A "black" type of non-printing auxiliary pixel 106 is placed exterior to the image shape and a "white" type of non-printing auxiliary pixel 108 is placed interior to the image shape. It should be noted that the RET generated pixel 104 was retained in FIG. 3 for illustrative purposes only, it is not required for the present invention and in a preferred embodiment may in fact be replaced by a suitable auxiliary pixel. The auxiliary pixels 106 & 108 (and patterns of them in a preferred embodiment) are used to modulate the toner cloud density and distance from the photoreceptor during development.

These auxiliary pixels 106 & 108 may be above the frequency for printing on the MTF curve or they may be of sub-critical density, that is below the normal density threshold for printout in their respective regions so that they are non-printing in effect. This may be achieved typically in two ways; first in a laser based system for example, the laser may be modulated in a manner such that the laser intensity is so reduced that the auxiliary pixel location is achieved by substantial under-exposure. As a result, much more charge is retained on the photoreceptor at that location than there would be for a normal fully developed pixel at that location. Second, in the alternative or in combination with laser intensity modulation, the pulse width may be modulated to such a high frequency and thereby down to such a small size that no toner (or an insufficient amount of toner to survive transfer to a substrate) adheres to the photoreceptor sufficient to allow printing. A pulse width and position modulator (PWPM) may be used in a preferred embodiment to accomplish this. PWPM techniques are well known in the art. U.S. Pat. No. 5,184,226 and U.S. Pat. No. 5,504,462, which are both incorporated by reference herein for their teaching, provide exemplary examples.

The addition of such small non-printing pixels to a digital image will move the toner cloud toward or away from the photoreceptor in the neighborhood of an area to be developed. The auxiliary pixels may be either 106 "black" or "on" pixels in an otherwise "off" area, or 108 "white" (that is, "off" pixels in an otherwise "on" area). Depending on the system needs, the actual laser intensity or MTF frequency may be the same for both the "white" 108 and "black" 106 auxiliary pixel. In that case there is really only a single type of auxiliary pixel placed both within and without the image shape. When two types of auxiliary pixel are employed, their density or frequency is different but they are still always non-printing in and of themselves, whether employed singly or adjacently clumped together in an group of auxiliary pixels. By that we mean that all pixel locations that are originally "on" in the bit map will still print as black, regardless that an auxiliary pixel has been substituted at that location. All pixel locations that are "off" will also still not print, regardless that an auxiliary pixel has been substituted at that location. So while a 108 "white" auxiliary pixel taken and placed in isolation might actually develop as black on a print, when used as per the invention and substituted in an "on" printing area, there is no effective change relative to the intended input image bitmap. Thus it is non-printing in effect in and of itself, even when used in a clustered combination or directly adjacent any number of other auxiliary pixels.

The auxiliary pixels will produce small attractively biased or reversed biased areas on the photoreceptor. The attractively biased 106 areas will not develop toner on the photoreceptor, or develop so little, that it will not appear in the final print, because they are beyond the critical frequency on the development (or transfer) MTF. What they will do however, is encourage a toner cloud close enough to the photoreceptor to mitigate the spreading effect of the surrounding cleaning field. Of course, a corresponding statement in the alternate is true for the reverse biased areas 108; they will discourage or repel toner away from the photoreceptor. Thus, auxiliary pixels will have a printing effect upon original pixels which they neighbor. The result is that the development cloud (or a development brush) will not be repelled as much from surrounding white areas due to "black" non-printing auxiliary pixels 106, and the development field will not be so strong near the sharp edges, due to non-printing "white" auxiliary pixels 108. In this way auxiliary pixels will enhance the printing of original pixels in a manner as intended by the original bit map by mitigating the edge displacement and halo problems endemic to increased printing system speed and throughput. Numerous options exist for placement of non-printing pixels to use this effect.

Figure 4:
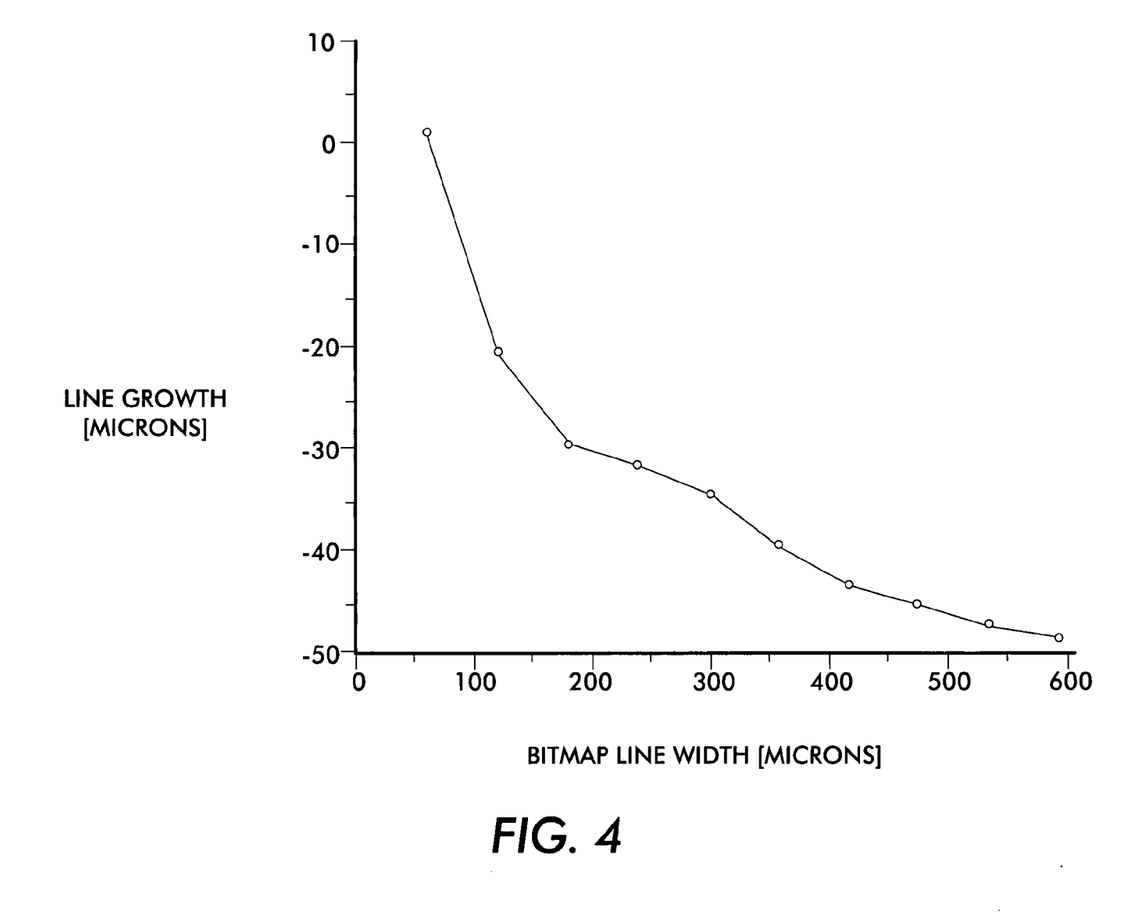
FIG. 4 is a graph of empirically observed line growth for parallel positive lines.

FIG. 4 depicts the experimentally observed negative line growth found with parallel positive lines. This data substantiates the progressive line narrowing for positive (that is, black on white background) parallel lines. The wider the line, the greater the amount of line shrinkage. There are two effects in operation here causing the negative line growth. First, the MTF of the cleaning field spreads the white background area across the black line, thus displacing the edge inward. Second, the strong demand for toner in the middle of the line "recruits" toner from the edge of the line, thus further reducing supply at the edge. In order to control line growth, non-printing black auxiliary pixels 106 are inserted around the line and non printing white pixels 108 are inserted within the line.

Figure 5:
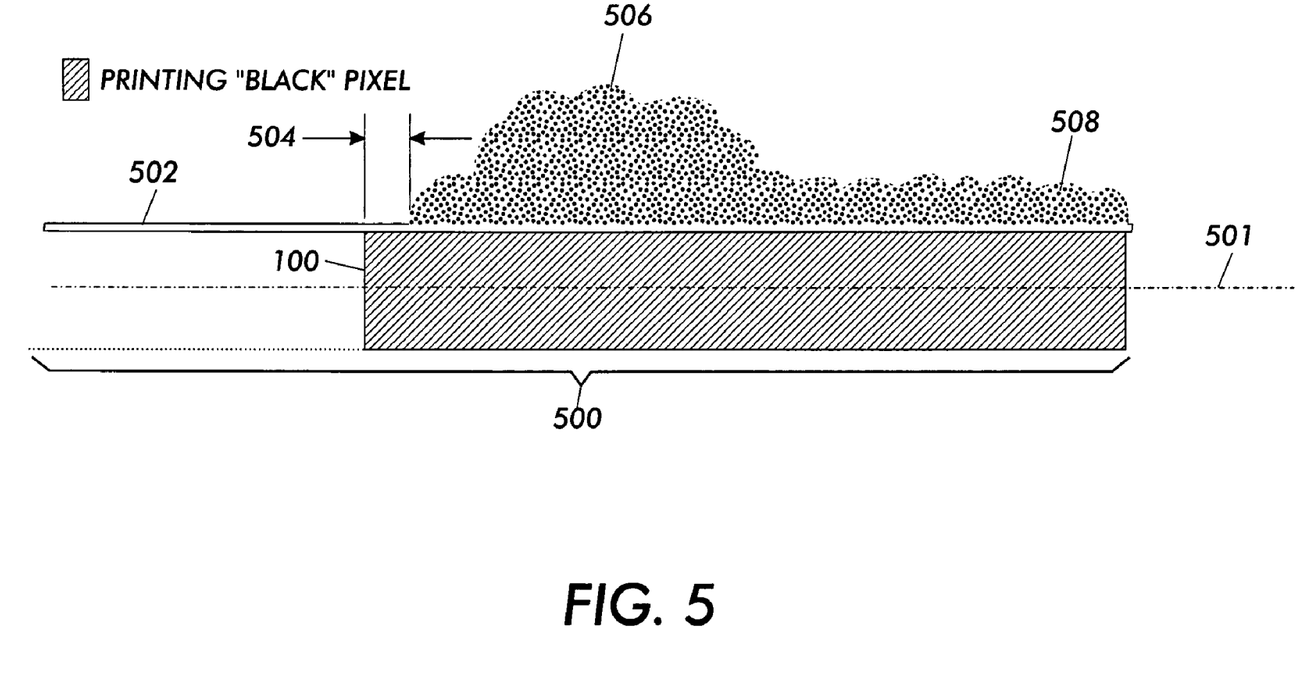
FIG. 5 is a sectional, elevational view taken through an intended bit map for a large shape in the image at its edge depicting the deposited toner resulting on the photoreceptor.

In FIG. 5 we have depicted a bitmap slice 500 of a pixel pattern for a solid shape at it's edge. Cross-sectioning through the bitmap slice 500 at line 501, and looking at the photoreceptor 502 as on edge at that location corresponding to the bitmap slice 500 data, display is made of a typical resulting toner accumulation as found on a photoreceptor 502. There we can see lead edge deletion by the edge displacement 504 of the toner from the intended edge 100. Also note toner excess buildup 506 as in contrast to an area of desired toner coating 508.

The origin of edge displacement 504 and the resulting lead edge deletion image defect is best understood in terms of the physics of the toner cloud development process. When a toner cloud developer subsystem is not printing, the toner cloud is repelled from the photoreceptor by a cleaning field. When the latent image on the photoreceptor changes from background (i.e., no developed toner) to image (developed toner desired), the directions of the fields in the space above the photoreceptor change directions, from a repelling or cleaning field to an attractive or developing field. This is accompanied by the usual fringe field effects. Since the toner cloud is initially some distance from the photoreceptor, there is a finite time that it takes the cloud to respond to the field and reach the photoreceptor. This cloud motion time depends on the tribo of the toner in the cloud and the development field strength. During this finite time no toner is being developed on the latent image, and the lead edge deletion results. The length of the lead edge deletion (edge displacement 504) on the image then increases as the product of this cloud motion time, and the speed of the photoreceptor with respect to the developer housing. Thus, the lead edge deletion problem becomes worse as the process speed increases.

Figure 6:
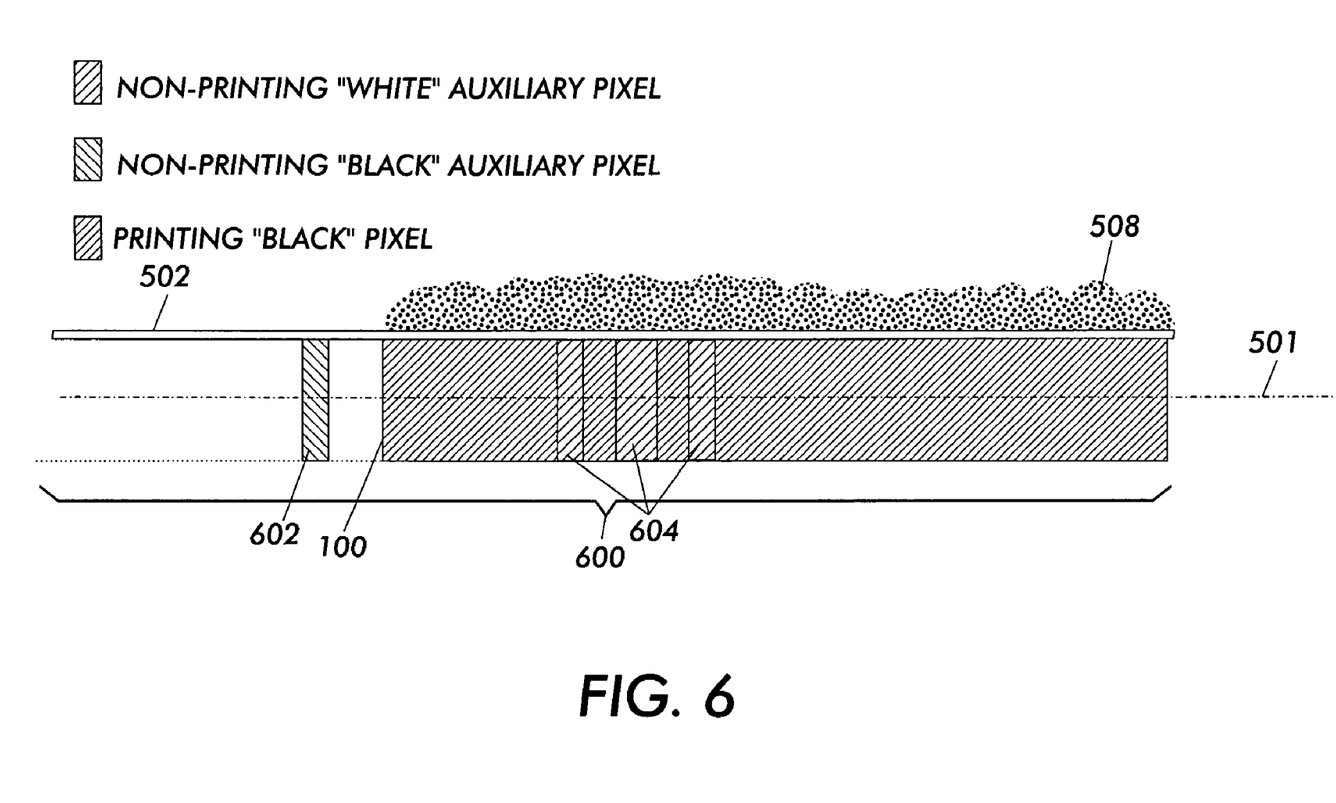
FIG. 6 is a sectional, elevational view and bit map of the shape depicted in FIG. 5 with the addition of auxiliary pixels.

With FIG. 6 the input data of FIG. 5 is rendered with the insertion of auxiliary pixels in a manner exemplary of a preferred embodiment of the present invention. The bitmap slice 600 comprises the input data of bitmap slice 500 with the addition of non-printing "black" pixels 602 and non-printing "white" pixels 604. Again photoreceptor 502 is displayed on edge at the location corresponding to the cross-section line 601 through bitmap slice 600. This shows how a preferred embodiment of auxiliary pixels yields an even coating of toner 508 in all intended areas, and the absence of any edge displacement 504 from the intended edge 100.

There is a corresponding image defect on the trailing edge of solid area images, image drag-out. In this case, the edge displacement corresponds to toner moved into the background area which should remain with-out toner. This results both from Coulomb repulsion between charged toner particles, and from fringe field effects. Image drag-out is more endemic to liquid development systems, and is minimized by the use of "white" auxiliary pixels 604 dispersed within the solid image near the trailing edge. This has the purpose of decreasing the amount of toner deposited along this trailing edge. As the height of the toner pile 506 near this trail edge decreases, the lateral fringe fields forcing toner into the neighboring background area decreases.

There are two actions associated with line displacement to be overcome. First, the MTF of the cleaning field spreads the white background area across the black shape, thus displacing the edge inward. Second, the strong demand for toner in the middle of the shape recruits toner from its edge, thus further reducing the supply at the edge. The positive "black" auxiliary pixels 602 diminish the cleaning field, while the "white" auxiliary pixels 604 reduce demand toward the middle of shape. Since there is less toner deposited in the middle of the shape, it is now available for development at the edge, and thus the shape will be widened. This widening occurs at the cost of optical density in the middle of the shape, which will be small, and the marginal increase in optical density with respect to DMA (developed mass per unit area) is less than at lower DMAs.

The present invention is directed to digital halftones. Ordered dither is a halftone technique which represents continuous tones with clusters of dots arranged to give darker or lighter patterns. Input values are compared against a fixed sized screen, and dots are added to the dither lattice with increasing gray levels. Ordered dither techniques include white noise, cluster-dot and dispersed-dot. The major ordered dither techniques are the clustered-dot dither and dispersed-dot dither techniques. Of the two techniques, clustered dot is by far the most used, since it reproduces well with xerographic and similar electrostatically based printing technologies. Both of those techniques are based upon a threshold array pattern or cell that is of a fixed size. For example, 6×6 threshold arrays may be compared with the digital input values. If the input digital value is greater than the array pattern number, a 1 is produced and, if it is less, a 0 value is assigned. The number of levels that can be represented using either technique depends on the size of the array. For example, a 6×6 cell can produce 36 unique levels. Examples of clustered dot types are compact and spiral types.

Stochastic screening is yet another halftoning technique. A stochastic halftone cell is a large threshold array that produces random appearing patterns in the halftone image. One of the advantages of stochastic, or non-periodic screening over periodic screening is the suppression of moiré. However it has a less desirable image quality, having higher image noise which leads to more grainy looking images than for example, clustered dot. U.S. Pat. No. 5,673,121 discloses an idealized stochastic screen, characterized by all of the predominant color dots (black or white) being uniformly distributed.

In the discussion that follows the focus will be upon cluster dot halftones which are the preferred embodiment of the invention. However, application to other halftone cell types such as dispersed dot and stochastic are within the invention as well.

Figure 7:
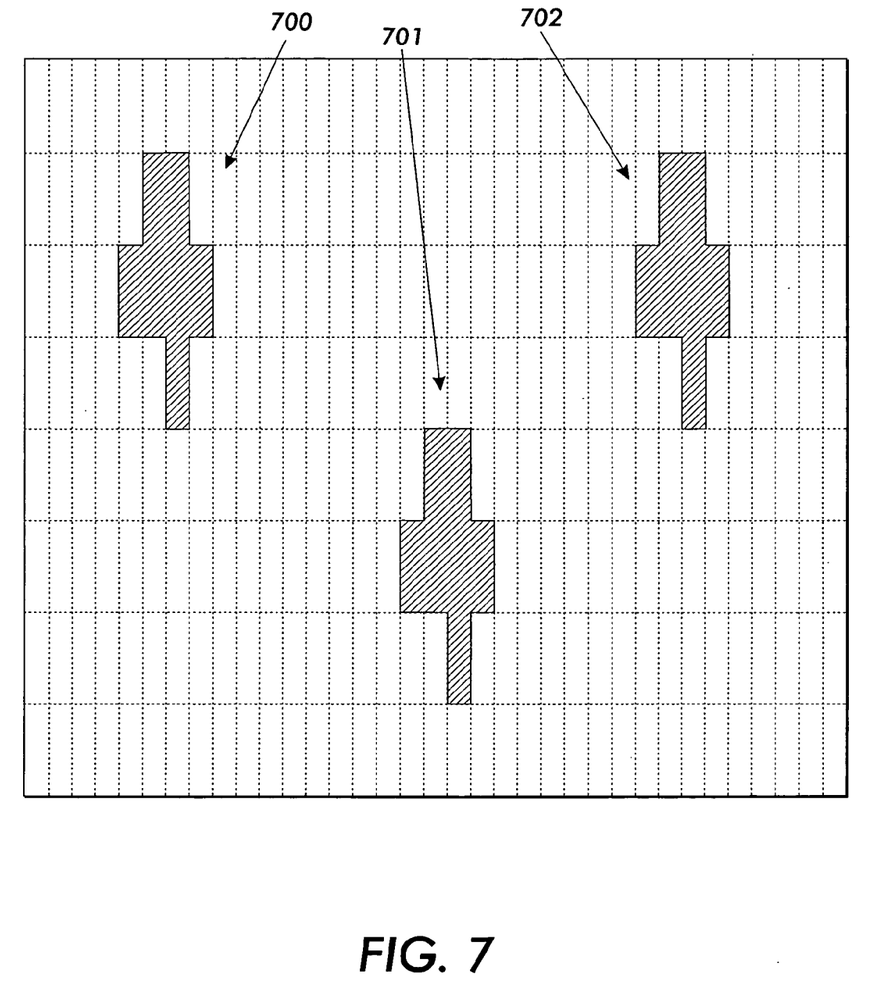
FIG. 7 is a bit map of three compact halftone dots.

Turning now to FIG. 7 there is presented a bitmap representation of three compact halftone dots 700, 701, & 702. These compact dots 700 are at the lighter end of the tone spectrum and typically represent picture highlight data. Such highlight data often fails to print completely, or at all, particularly as process speeds are accelerated.

Figure 8:
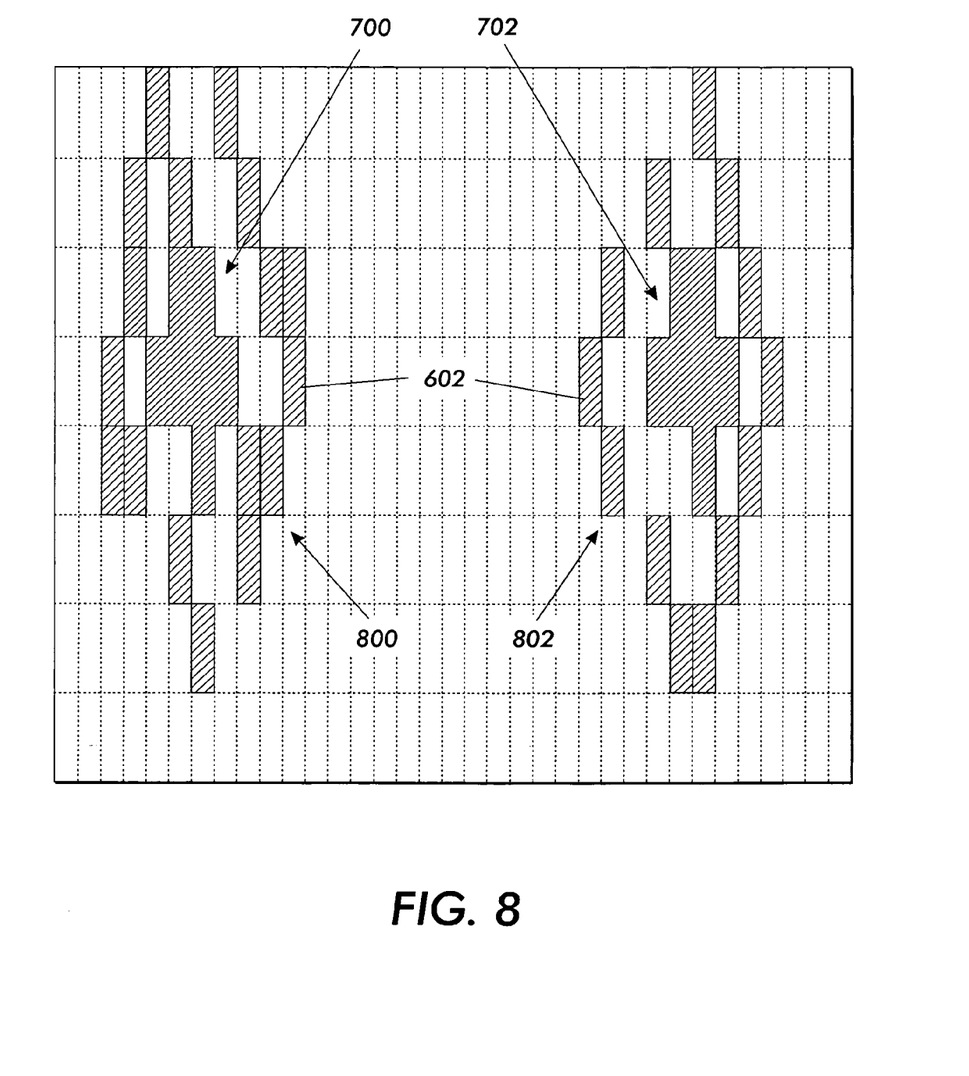
FIG. 8 is a bit map of two of the compact halftone dots depicted in FIG. 7 now with auxiliary pixels.

In FIG. 8 the bitmap data of FIG. 7 is rendered with the insertion of auxiliary pixels 602 in a manner exemplary of a preferred embodiment of the present invention. Compact halftone dots 700 & 702 have been rendered with two alternative patterns of black auxiliary pixels 602. While the pattern 802 found around halftone dot 702 is useful in some systems, the pattern 800 around 700 is the more preferred. In one system emulator halftone pattern 702 still failed to print with pattern 802. However, on the same emulator halftone dot 700 printed when utilized with pattern 800. This suggests that the optimum pattern is system dependent and operationally dependent. Different systems will favor different patterns and the same system operated at varying speeds may require different patterns.

Figure 9:
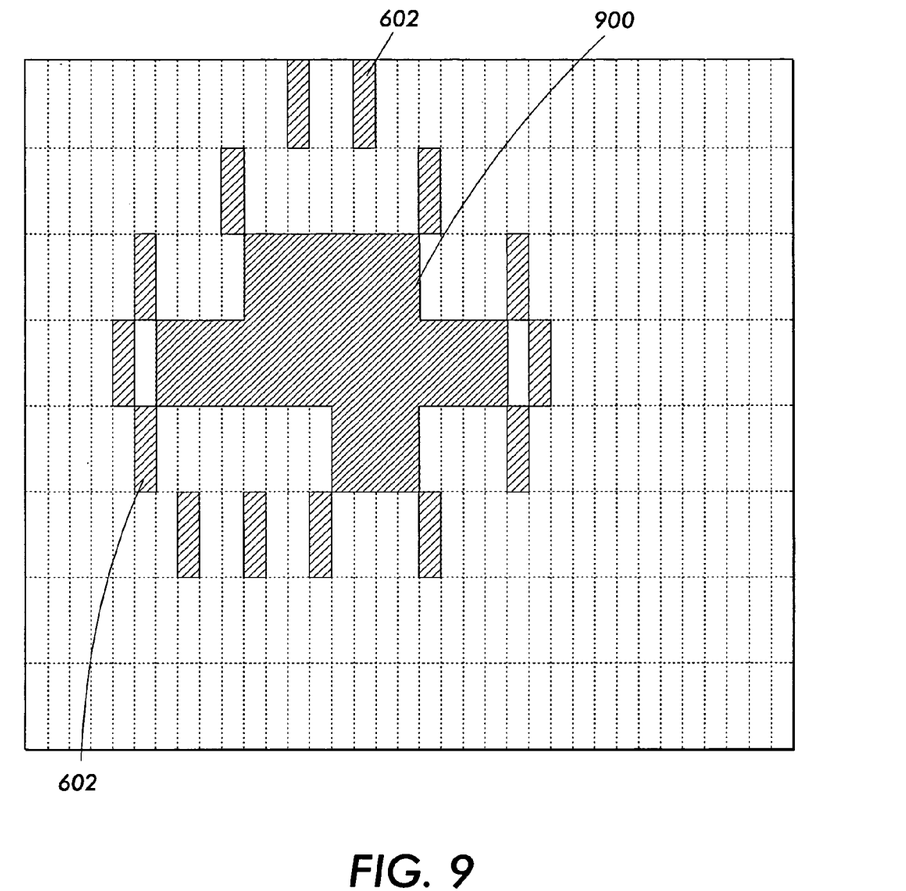
FIG. 9 is a bit map of a darker compact halftone dot with auxiliary pixels.

FIG. 9 is provided as an alternative example and preferred embodiment of auxiliary pixels applied as a pattern to halftone dot 900. Halftone dot 900 is at an even darker gray level than halftone dot 700. Depicted is a typical preferred pattern of auxiliary pixels 602 for such a gray level halftone dot 900.

Figure 10:
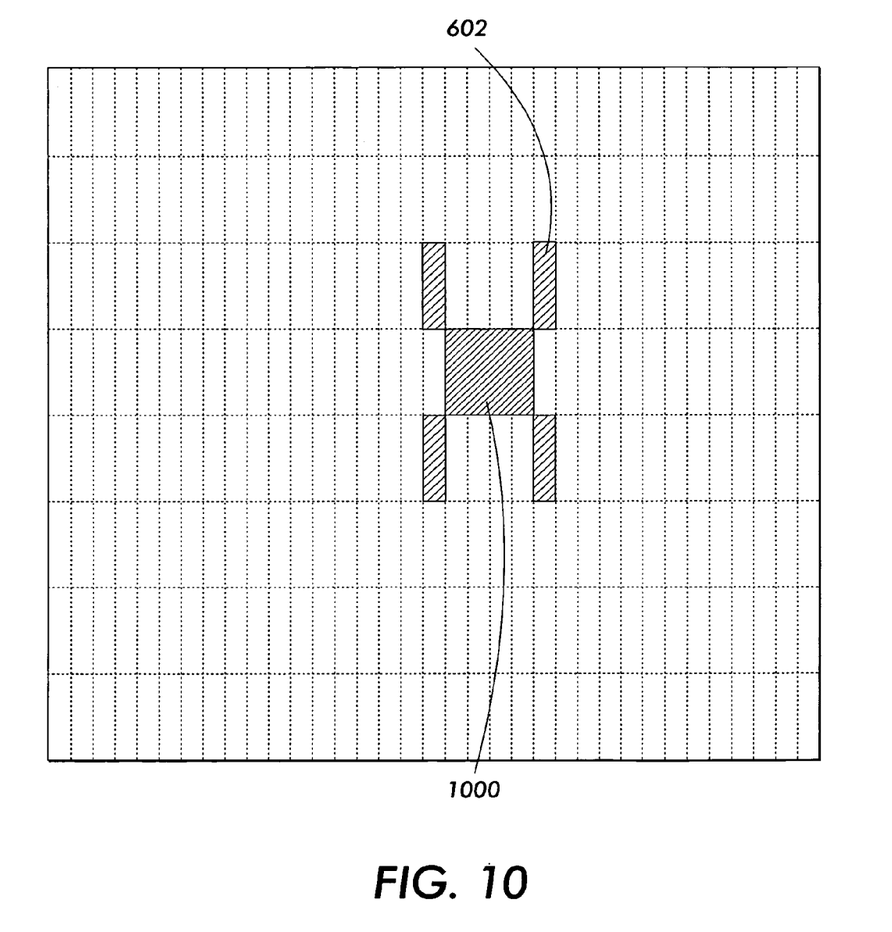
FIG. 10 is a bit map of a lighter compact halftone dot with auxiliary pixels.

FIG. 10 provides an example and preferred embodiment of a very small highlight halftone dot utilizing the invention. The auxiliary pixels 602 have been placed near the corners of halftone dot cluster 1000. This embodiment is proven on a system test bed. However, a different pattern of auxiliary pixels (particularly with a greater number of auxiliary pixels) may be more optimum empirically in another print system. At all times, the auxiliary pixels are non-printing in and of themselves, either singly or clustered in any pattern or combination. Auxiliary pixels are simply an adjunct to the original image pixels as found within an original halftone dot bitmap. Though substituted within an halftone dot bitmap for select original pixels they never cause a change to the image pattern from the intended original bitmap other than to more faithfully render that intended original bitmap via the halftone dot.

Figure 11:
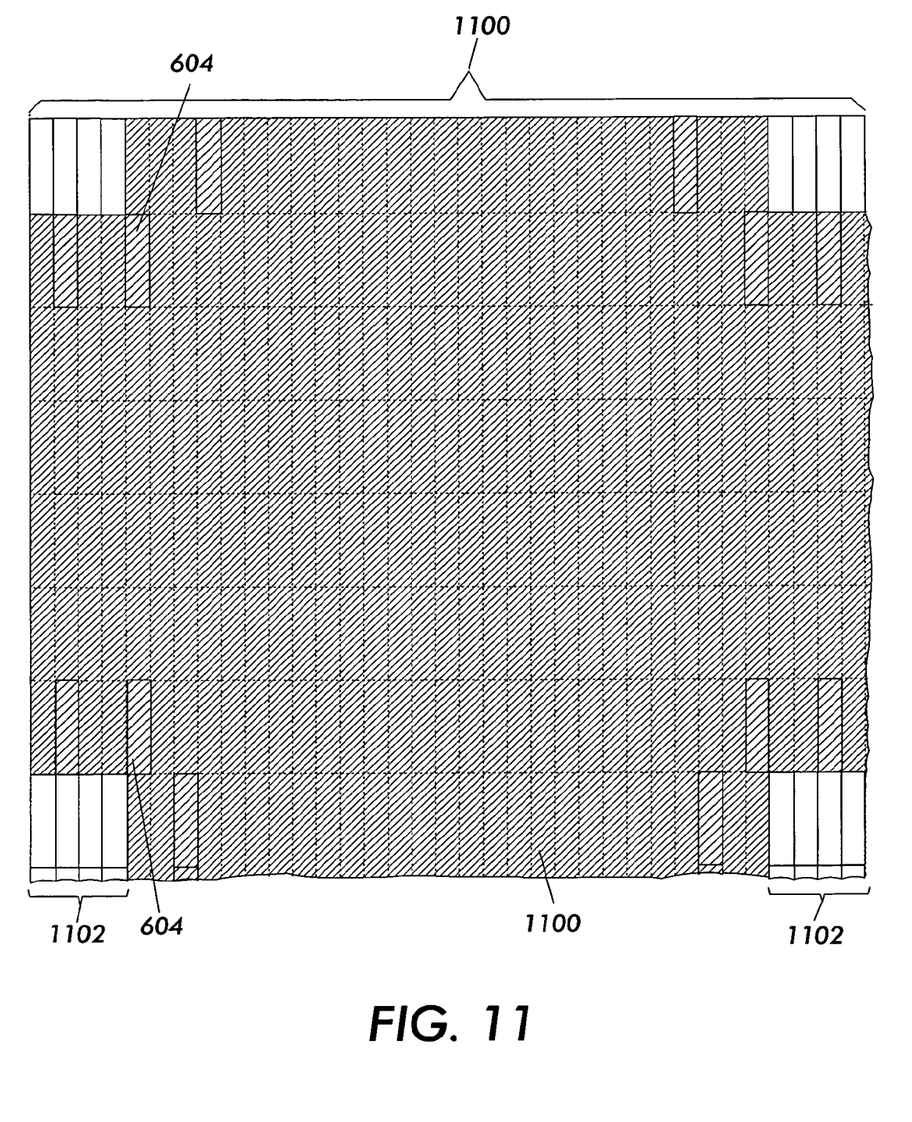
FIG. 11 is a bit map of a very dark compact halftone dot with "white" auxiliary pixels.

In FIG. 11 four halftone dots 1100 depict the other end of the gray scale spectrum where shadow detail is typically lost. "Off" pixels 1102 at each corner are very nearly overwhelmed by toner spread from the toner deposited with the "On" pixels. By placing "white" auxiliary pixels 604 in close proximity to the "off" pixels 1102 toner deposition is reduced and thereby discouraged from spreading across the white area.

Figure 12:
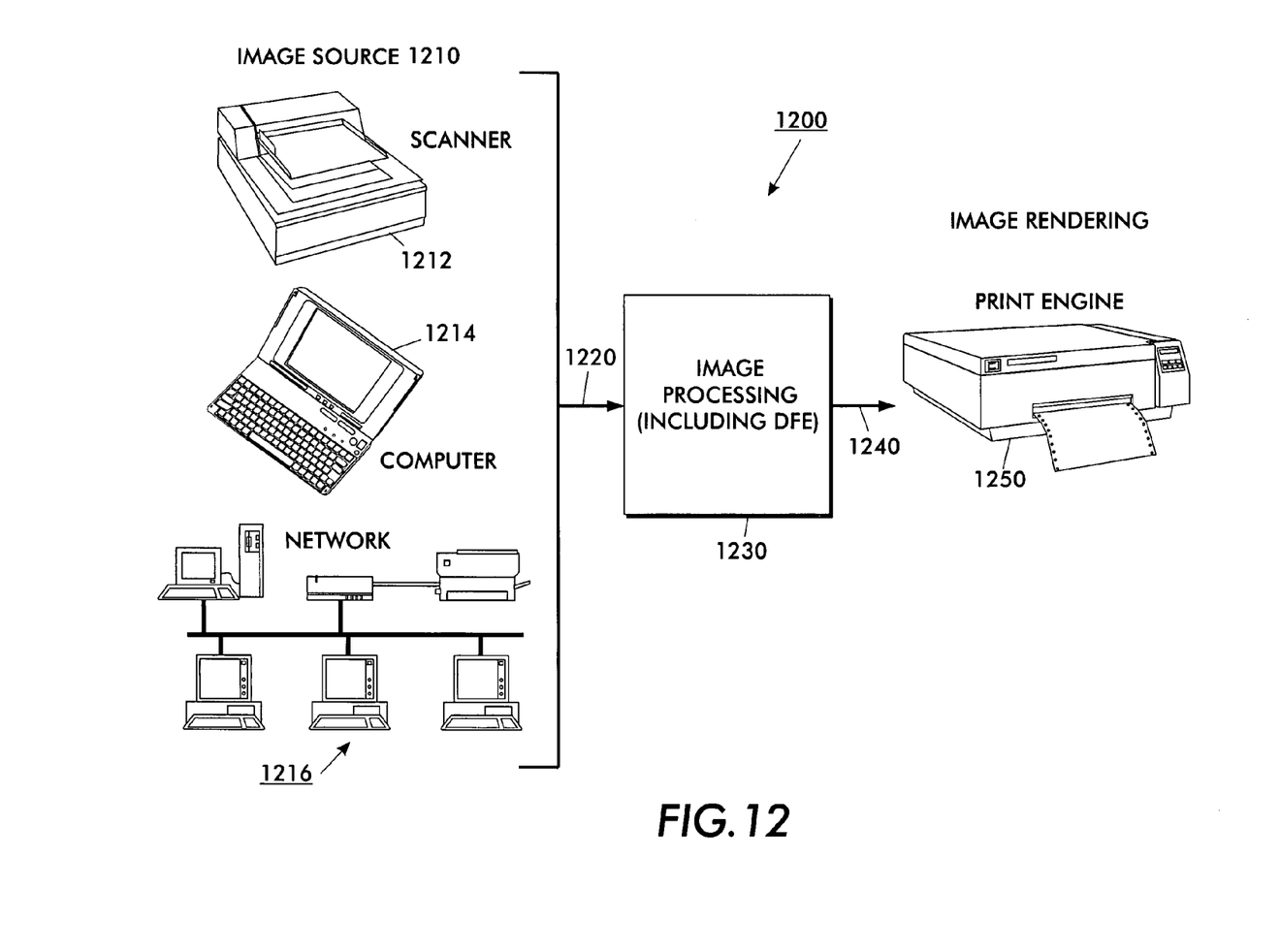
FIG. 12 is a general representation of a suitable system-level embodiment for the invention.

Turning now to FIG. 12, there is shown an embodiment of a digital imaging system 1200 that incorporates the features of the present invention. Digital imaging system 1200 includes image source 1210 that may include scanner 1212, computer 1214, network 1216 or any similar or equivalent image input terminal (IIT) to generate original input image data 1220. Image data 1220, representing an image to be printed, is supplied to an image processing system 1230, that may incorporate what is known in the art as a digital front end (DFE). Image processing system 1230 process the received original image data 1220 to produce print ready binary data 1240 that is supplied to print engine 1250. In response to print ready data 1240, print engine 1250 generates an output document or print image on suitable media. Print engine 1250 is preferably a electrophotographic engine; however, one skilled in the art will appreciate that any other suitable engine may be used such as an ionographic engine. The present invention is directed towards aspects of image processing system 1230 depicted in FIG. 12. In particular, the present invention is directed to embedding auxiliary pixels into image data 1220.

There are a variety of approaches apparent to those skilled in the art that may be taken in image processing system 1230 for processing received original image data 1220 so as to produce binary data 1240 with embedded auxiliary pixels. It will also be appreciated by those skilled in the art that the exact type and pattern of auxiliary pixel utilized will vary depending upon the particulars of print engine 1250. A preferred approach utilizes a halftoner located in a DFE as found in the image processing system 1230. A common example of such would be a Postscript™ compatible printer. A cluster dot halftone bitmap representation is stored for each desired increment or level of grayscale. Stored in each such bitmap are auxiliary pixels as depicted and discussed above in FIGS. 8, 9, 10 and 11. The halftoner halftones the image data using the stored clustered dot bitmaps with embedded auxiliary pixels, thereby inserting auxiliary pixels into the image data 1220.

Thus by introducing non-printing auxiliary pixels into the bitmap of a halftone dot, local control of the image development is obtained by modification of local average voltage in the development nip. Using auxiliary pixels positions the toner cloud by modulating it and may also compensate for cleaning field and toner supply effects. Auxiliary pixels utilized as discussed above can better position the toner cloud and ensure adequate toner supply to all parts of the image so that the desired printing pixels will print as intended and in this way overcome edge displacement, image halo, highlight and shadow loss, improving the TRC gamut as well as other slow toner problems.

While the embodiment disclosed herein is preferred, it will be appreciated from this teaching that other variations or examples may be made by those skilled in the art. For example other embodiments would include: ionographic systems; brush roller toner delivery systems; and CEP—Contact Electrostatic Printing or similar charged cake toner delivery systems. However, these examples are not exhaustive, nor is there any intent to exclude various alternative, modifications, variations or improvements therein from being encompassed by the following

What is claimed is:

1. An improved halftone cell data structure stored in a memory, for an electrostatographic system comprising:
   a halftone cell including a plurality of original pixels further comprised of "on" and "off" pixels; and
   at least one black auxiliary pixel placed around and exterior to the "on" pixels of the halftone cell to improve edge displacement or halo problems in the printing of the halftone cell by better controlling toner cloud development in the electrostatographic system.

2. The improved halftone cell data structure stored in memory of claim 1, wherein the black auxiliary pixel is placed near the corners of the halftone cell.

3. The improved halftone cell data structure stored in memory of claim 1, wherein the auxiliary pixel comprises a "white" auxiliary pixel substituting for one of the plurality of original pixels found in the corners of the halftone cell.

4. The improved halftone cell data structure stored in memory of claim 1, wherein the halftone cell is a clustered dot type.

5. The improved halftone cell data structure stored in memory of claim 1, wherein the halftone cell is a dispersed dot type.

6. The improved halftone cell data structure stored in memory of claim 4, wherein the clustered cell is a compact dot type.

7. The improved halftone cell data structure stored in memory of claim 4, wherein the clustered cell is a spiral dot type.

8. The improved halftone cell data structure stored in memory of claim 1, wherein the halftone cell is a stochastic type.

9. A method for improving the printing of an image in an electrostatographic system, said method comprising:
   receiving a source image comprising original pixel data; and
   processing the source image original pixel data with a halftone cell comprising embedded black auxiliary pixels and spaced at least one pixel outside the "on" pixels contained therein to improve edge displacement or halo problems by better controlling toner cloud development in the printing of the image.

10. The method for improving the printing of an electrostatic image of claim 9, wherein the step of processing includes using halftone cells of a cluster dot type.

11. The method for improving the printing of an electrostatic image of claim 9, wherein the step of processing includes using halftone cells of a dispersed dot type.

12. The method for improving the printing of an electrostatic image of claim 9, wherein the step of processing includes using halftone cells of a stochastic type.

* * * * *